United States Patent [19]

Reich et al.

[11] Patent Number: 6,066,746
[45] Date of Patent: May 23, 2000

[54] RADIATION CURING OF DIHYDROFURAN DERIVATIVES

[75] Inventors: Wolfgang Reich, Maxdorf; Reinhold Schwalm, Wachenheim; Erich Beck; Lukas Häussling, both of Bad Dürkheim; Oskar Nuyken; Roman-Benedikt Raether, both of Munich, all of Germany

[73] Assignee: BASF Aktiengesellschaft, Ludwigshafen, Germany

[21] Appl. No.: 09/266,913

[22] Filed: Mar. 12, 1999

Related U.S. Application Data

[62] Division of application No. 08/734,599, Oct. 22, 1996.

[30] Foreign Application Priority Data

Oct. 23, 1995 [DE] Germany .......................... 195 39 294
Mar. 15, 1996 [DE] Germany .......................... 196 10 349

[51] Int. Cl.⁷ ...................... C07D 307/26; C07D 307/32
[52] U.S. Cl. .................. 549/479; 549/429; 549/499; 549/500; 549/507; 549/509; 522/168
[58] Field of Search .............................. 522/168; 528/365, 528/403, 406, 417; 526/270; 549/479, 507, 509, 499, 500, 429

[56] References Cited

U.S. PATENT DOCUMENTS

| | | | |
|---|---|---|---|
| 3,723,398 | 3/1973 | Dowbenko | 528/270 |
| 3,816,279 | 6/1974 | Schlesinger | 522/168 |
| 3,985,942 | 10/1976 | Suzuki et al. | 526/270 |
| 4,011,282 | 3/1977 | Bacskai | 260/836 |
| 4,383,025 | 5/1983 | Green et al. | 522/168 |
| 4,816,496 | 3/1989 | Wada et al. | |
| 4,920,156 | 4/1990 | Koleske et al. | 522/168 |
| 4,952,612 | 8/1990 | Brown-Wensley et al. | 260/836 |
| 5,102,771 | 4/1992 | Vogel et al. | 522/31 |
| 5,122,561 | 6/1992 | Matsumoto et al. | 524/323 |
| 5,283,304 | 2/1994 | Nakabayashi et al. | 526/270 |
| 5,430,073 | 7/1995 | Van Dijk et al. | 522/168 |
| 5,439,996 | 8/1995 | Baird et al. | 526/134 |
| 5,627,011 | 5/1997 | Munzel et al. | 522/49 |
| 5,660,937 | 8/1997 | Ishidoya et al. | 528/363 |
| 5,668,245 | 9/1997 | Marrocco, III et al. | 528/422 |

FOREIGN PATENT DOCUMENTS

96 11 6471 4/1983 European Pat. Off.
2073760 10/1981 United Kingdom.
97/35907 10/1997 WIPO.

OTHER PUBLICATIONS

Database WPI, Section CH, Week 9404, Derwent Publications Ltd., London, GB; Class A26, AN 94–031872, XP002064514 & JP 05 339 373 A (Hitachi Chem Co Ltd), Dec. 21, 1993 *Zusammenfassung*.

Chemical Abstracts, vol. 66, No. 18, May 1, 1967, Columbus, Ohio, US; Abstract No. 76462, Novikov, S.N. et al: "Photopolymerization of Monomers Forming Charge Transfer Complexes With Each Other" XP002064513 *Zusammenfassung*.

C.G. Roffey, Photopolymerization of Surface Coatings, John Wiley & Sons, pp. 74–75 and 117–118, 1982.

*Primary Examiner*—Susan W. Berman
*Attorney, Agent, or Firm*—Oblon, Spivak, McClelland, Maier & Neustadt, P.C.

[57] ABSTRACT

Process for producing coatings or moldings by radiation curing, which involves using high-energy light to irradiate radiation-curable compositions containing 1–100% by weight, based on the total amount of free-radically or cationically polymerizable compounds, of compounds A) containing at least one cationically polymerizable 2,3-dihydrofuran group.

5 Claims, No Drawings

RADIATION CURING OF DIHYDROFURAN DERIVATIVES

This application is a Division of application Ser. No. 08/734,599 Filed on Oct. 22, 1996 (pending).

The present invention relates to a process for producing coatings and moldings by radiation curing.

The radiation curing of free-radically or cationically polymerizable compounds is widely known. The radiation curing of acrylate compounds has acquired particular industrial importance; with acrylate compounds, however, there is the fundamental problem that the photopolymerization is inhibited by oxygen.

Since with cationic photopolymerization the problem of oxygen inhibition does not occur, cationically polymerizable compounds might be one alternative to the free-radically polymerizable compounds. What is required, however, is a curing rate comparable with that of the free-radically polymerizable compounds, especially the acrylate compounds, with performance properties of the resulting coatings or moldings which are where possible just as good as those obtained with said free-radically polymerizable compounds.

EP-A-123 912 describes dihydropyrans as cationically polymerizable cyclic vinyl ethers for radiation curing. However, the curing rate, ie. the reactivity in the course of radiation curing, is completely inadequate.

Dihydrofurans and their thermal, cationic polymerization are known per se, for example from Polymer Bulletin 28 (1992) 117–122.

It is an object of the present invention, therefore, to provide a process for producing coatings or moldings by radiation curing, where little or no oxygen inhibition occurs, the reactivity of the compounds employed is as high as possible, and the performance properties of the resulting coatings and moldings are satisfactory.

We have found that this object is achieved by a process for producing coatings or moldings by radiation curing, which comprises using high-energy light to irradiate radiation-curable compositions containing 1 to 100% by weight, based on the total amount of cationically and, if desired, free-radically polymerizable compounds, of compounds A) containing at least one cationically polymerizable 2,3-dihydrofuran group.

We have also found radiation-curable compositions suitable for such a process.

The compositions A) are preferably compounds containing 1–6 cationically polymerizable 2,3-dihydrofuran group. The molecular weight of the compounds A) is preferably below 5000 g/mol, particularly preferably below 1000 g/mol.

Compounds A), of relatively high molecular weight, can be obtained in particular by attaching 2,3-dihydrofuran or derivatives thereof to polymers by means of polymer-analogous reactions.

Particularly suitable compounds A include those containing at least one of the following groups:

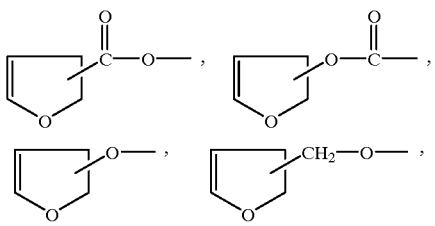

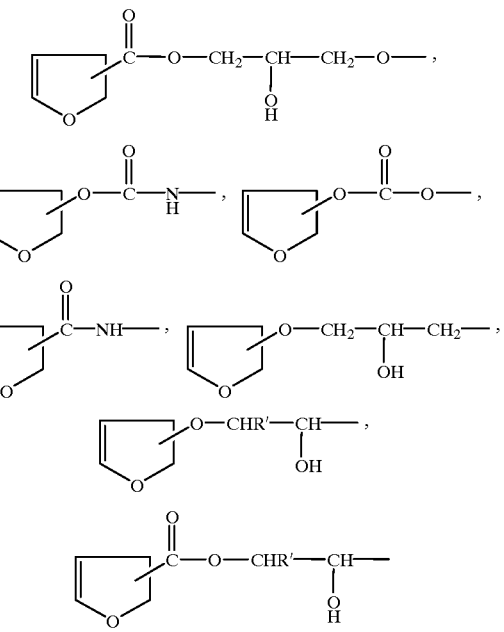

in which R' is H, an organic radical of 1–20 carbons, in particular a $C_1$–$C_{20}$ aliphatic radical or $C_5$–$C_{20}$-aryl, -alkaryl or -aralkyl.

Examples of suitable compounds A) having a dihydrofuran group are those of the formula (I)

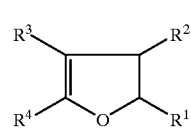

where, independently, $R^1$ and $R^2$ are H, C—OR' (R'=H, organic radical of 1–20 carbons, especially a $C_1$–$C_{20}$-aliphatic radical or $C_5$–$C_{20}$-aryl, -alkaryl or -aralkyl),

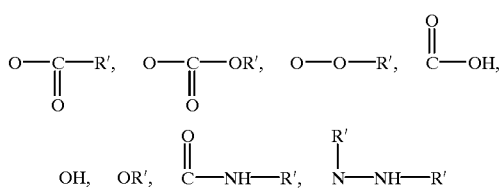

an aromatic or aliphatic hydrocarbon radical of 1–20 carbons with or without one or more carbonyl or ether groups, which may be substituted by one or more hydroxyls, or are $SiR'_3$, $R^3$ is H, $C_1$–$C_{20}$-alkyl or $C_1$–$C_{20}$-alkoxy, $R^4$ is H, $C_1$–$C_{20}$-alkyl or $C_5$–$C_{20}$-aryl, -aralkyl or -alkaryl, or $C_1$–$C_{20}$-hydroxyalkyl, or $R^3$ and $R^4$, or $R^1$ and $R^2$, each together as pairs, form a ring comprising a total of 4–5 carbons (including ring atoms of the dihydrofuran parent structure) which may also include an ether group and may be substituted by hydroxyl, carboxyl or amino.

Preferred compounds of the formula I are those where

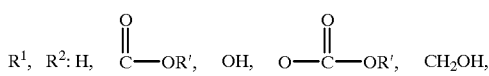

$C_1$–$C_{20}$-hydroxyalkyl, $C_1$–$C_{20}$-alkyl or $C_5$–$C_{10}$-aryl, $R^3$ is H, and $R^4$ is H, $C_1$–$C_{20}$-alkyl or $C_1$–$C_{20}$-hydroxyalkyl.

With particular preference, $R^1$, $R^3$ and $R^4$ are H and $R^2$ is as defined above, and in particular is H, $CH_2OH$, $C_1$–$C_{20}$-alkyl or phenyl.

Examples of compounds of the formula I are represented by the following structural formulae:

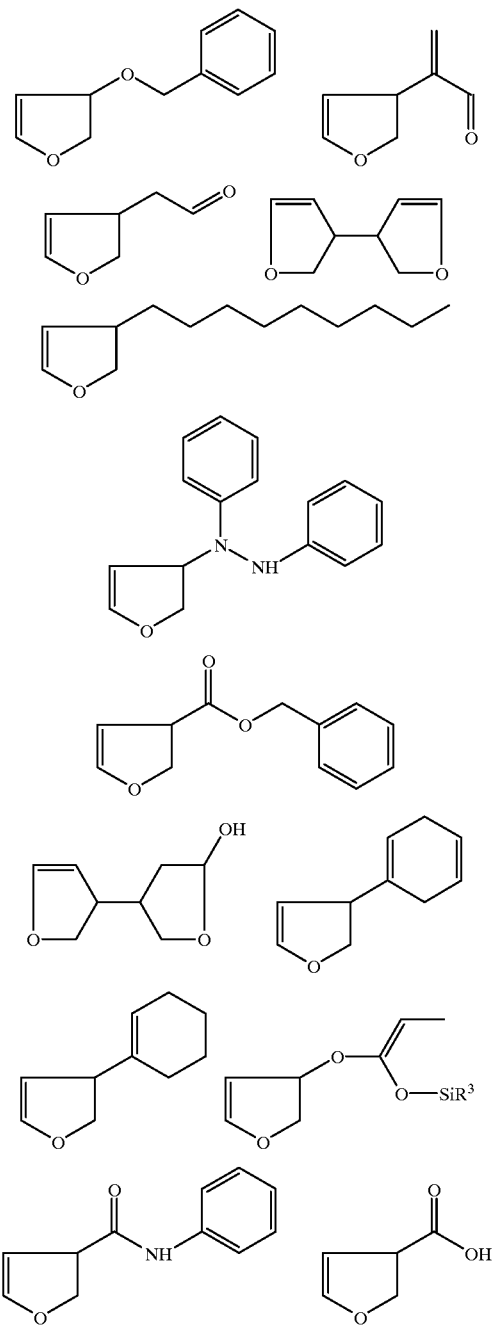

-continued

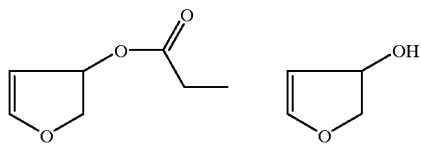
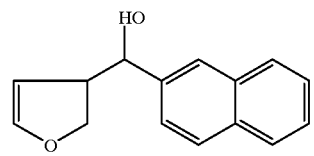
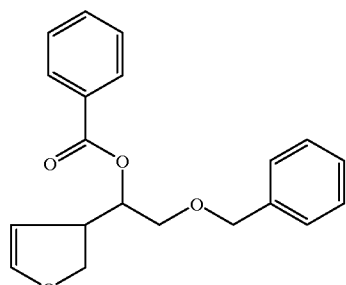
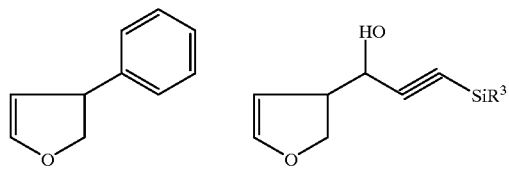
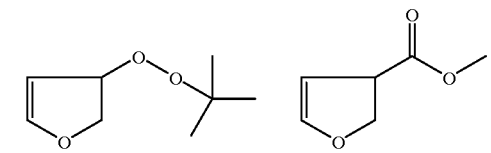
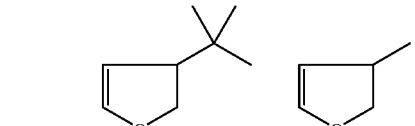
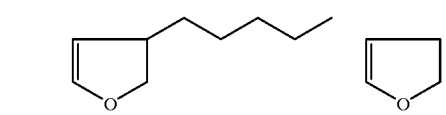
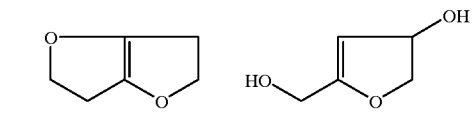
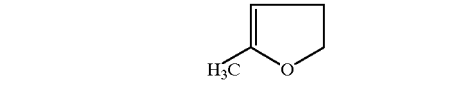
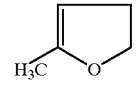

Particular mention may also be made of compounds I of the formulae

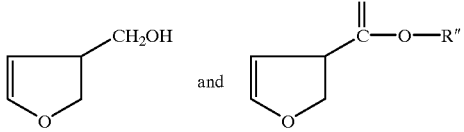

where R" is a hydrocarbon radical of up to 20 carbons, especially $C_1$–$C_{10}$-alkyl, phenyl or benzyl.

Examples of suitable compounds A) having two or more 2,3-dihydrofuran groups are those of the formula

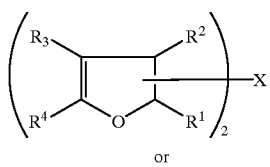

IIa or

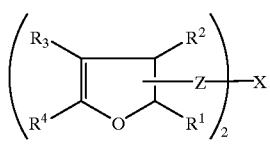

IIb where X is a single bond or a divalent group selected from:

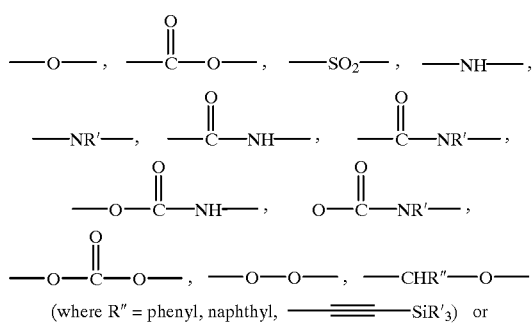

(where R″ = phenyl, naphthyl, ———≡———SiR′$_3$) or

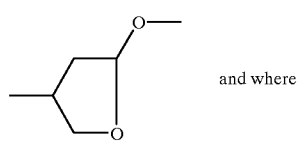

and where

Z is a single bond, $C_1$–$C_{10}$-alkylene or phenylene.

$R^1$–$R^4$ and R' are as defined above but one of $R^1$–$R^4$ is omitted (in compounds with two or more 2,3-dihydrofuran groups it is preferably $R^2$ which is omitted) and is replaced by Z or X.

In the most simple case, for example, X and Z are a single bond, $R^1$, $R^3$ and $R^4$ are H and $R^2$ is omitted, to give the following structural formula:

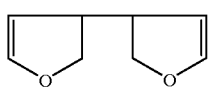

Other suitable compounds having two or more 2,3-dihydrofuran groups are those of the formula

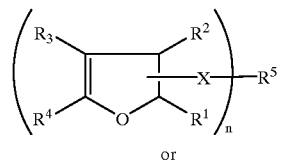

IIIa or

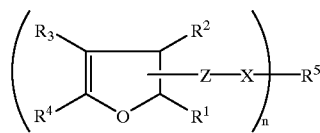

IIIb where $R^1$, $R^2$, $R^3$, $R^4$ and X and Z are as defined above, one of $R^1$–$R^4$ is omitted and is replaced by the bond to X or Z, n is 2–20, preferably 2–6, particularly preferably 2 or 3, and $R^5$, correspondingly, is a polyvalent hydrocarbon radical of 1–20 carbon atoms, especially $C_1$–$C_{20}$-alkyl or $C_5$–$C_{20}$-aryl, alkaryl or aralkyl with or without ether or ester groups.

Compounds having 2 or more 2,3-dihydrofuran parent structures can be obtained, for example, by reacting hydroxy-functionalized 2,3-dihydrofurans with polyfunctional carboxylic acids, isocyanates, epoxides, glycidyl ethers and/or chloroformates or by reacting carboxy-functionalized 2,3-dihydrofurans with polyfunctional alcohols, amines, epoxides, glycidyl ethers and/or hydrazines.

Preferred compounds of the formula IIIa where n=2 are

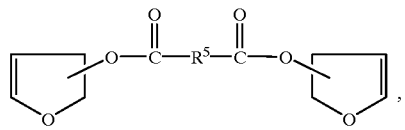

IV obtainable, for example, by esterifying the corresponding hydroxyl-substituted 2,3-dihydrofurans with dicarboxylic acids, dicarboxylic esters or dicarbonyl chlorides,

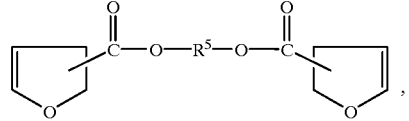

V obtainable by esterifying the corresponding carboxyl-substituted 2,3-dihydrofurans with diols,

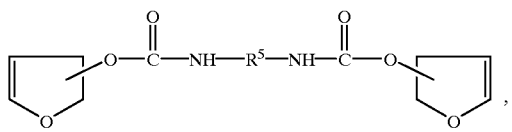

VI obtainable by reacting the corresponding hydroxyl-substituted 2,3-dihydrofurans with diisocyanates,

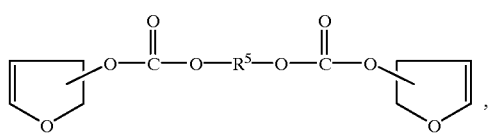

VII obtainable by reacting the corresponding hydroxyl-substituted 2,3-dihydrofurans with chloroformic esters of diols,

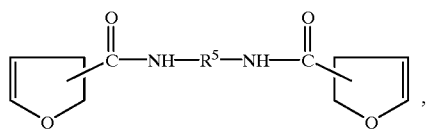

VIII obtainable by reacting the corresponding carboxyl-substituted 2,3-dihydrofuran derivatives with diamine compounds,

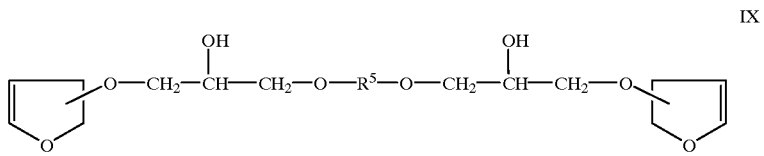

IX obtainable by reacting the corresponding hydroxyl-substituted 2,3-dihydrofurans with polyfunctional glycidyl ethers,

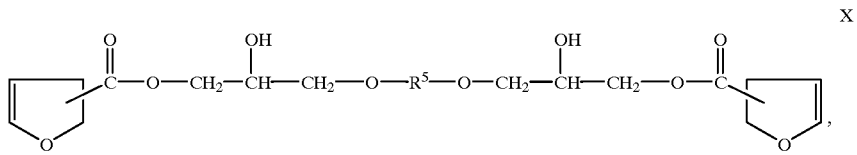

X obtainable by reacting the corresponding carboxyl-substituted 2,3-dihydrofurans with polyfunctional glycidyl ethers,

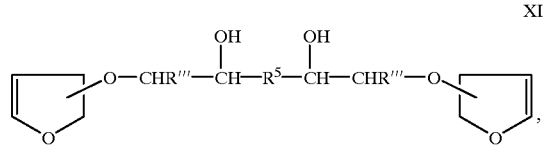

XI where $R''' = R'$ obtainable by reacting the corresponding hydroxyl-substituted 2,3-dihydrofurans with polyfunctional epoxides, and

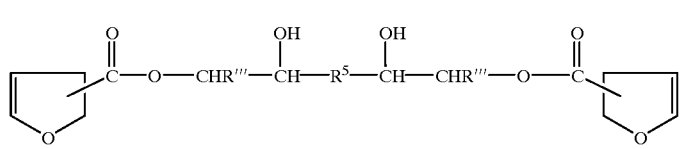

obtainable by reacting the corresponding carboxyl-substituted 2,3-dihydrofurans with polyfunctional epoxides.

A preferred compound of the formula IIIb is:

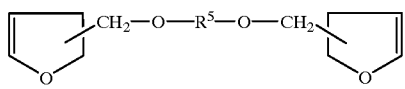

Preferred compounds of the formulae III where n is >2 are:

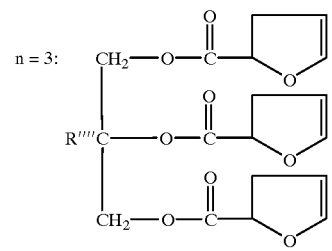

where R'''' = H, CH₃, CH₂CH₃ obtainable by reacting, for example, glycerol, trimethylolethane or trimethylolpropane with

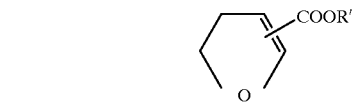

n = 4:

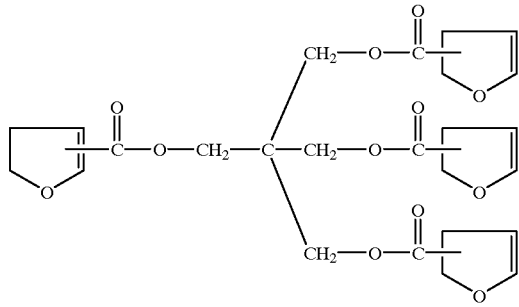

obtainable by reacting pentaerythritol with

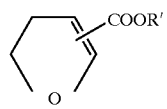

n=6: esterification product of sorbitol (Chemical Abstracts Registry Number 50-70-4) or dipentaerythritol with

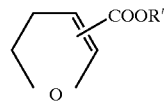

n>6: esterification product of polyvinyl alcohol with

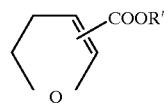

In the above formulae IIa, IIb, IIIa and IIIb, the radical $R^2$ is preferably omitted and replaced by the bond to X or Z.

$R^1$, $R^3$ and $R^4$ are preferably H.

X is preferably

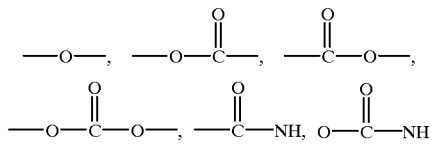

Z is preferably a single bond (and is therefore omitted) or is a methylene group.

$R^5$ is preferably $-(CH_2)_m-$ where m = 1-6, or is

The synthesis of 2,3-dihydrofuran or its derivatives where n=1 is known to the skilled worker and is described, for example, in P. Dimroth, H. Pasedach, Angew. Chemie 72 (1960) 865 or in M. A. Gianturco, P. Friedel, V. Flanagan, Tetrahedron Lett. 23 (1965) 1847.

The radiation-curable compositions employed in the novel process contain 1–100% by weight, preferably 5–100% by weight, particularly preferably 10–100% by weight, and very particularly preferably 30–100% by weight, based on the cationically and, if present, free-radically polymerizable compounds, of compounds A).

In particular, however, more than 50% by weight of the cationically and, if present, free-radically polymerizable compounds can be compounds A), or the polymerizable compounds may exclusively be compounds A).

In addition to compounds A), examples of other suitable cationically polymerizable compounds are, in particular, linear or cyclic vinyl ethers, such as vinyl methyl ether, vinyl ethyl ether, vinyl propyl ether, vinyl isobutyl ether, vinyl octadecyl ether, vinyl cyclohexyl ether, and α-methylvinyl alkyl ethers.

In addition to compounds A), other suitable cationically polymerizable compounds are epoxides, for example cyclopentene oxide, cyclohexene oxide, epoxidized polybutadiene, epoxidized soya oil, Degacure K 126 or glycidyl ethers, for example butanediol diglycidyl ether, hexanediol diglycidyl ether, eg. bisphenol A diglycidyl ether, and pentaerythritol diglycidyl ether.

In addition, it is likewise possible to employ cationically polymerizable monomers, such as unsaturated aldehydes and ketones, dienes such as butadiene, aromatic vinyl compounds such as styrene, N-substituted vinylamines such as vinylcarbazole, or cyclic ethers such as tetrahydrofuran.

In addition to cationically polymerizable compounds it is also possible to use, in addition, free-radically polymerizable compounds or both free-radically and cationically polymerizable compounds. Examples are aromatic vinyl compounds having up to 20 carbons, vinyl esters of carboxylic acids having up to 20 carbons and, in particular, (meth) acrylate compounds as described, for example, in R. Holman, U. V. and E. B. Curing Formulations for Printing Inks and Paints, London 1984.

In addition to monoacrylates, for example $C_1$–$C_{20}$-alkyl (meth)acrylates, compounds having two or more (meth) acrylic groups are also particularly suitable.

Examples which may be mentioned are trimethylolpropane triacrylate, dipropylene glycol diacrylate, tripropylene glycol diacrylate, hexanediol diacrylate or polyester, polyether, epoxy or urethane acrylates.

Preference is given to (meth)acrylate compounds with 2–6, especially 2–4, (meth)acrylic groups. The molecular weight of the acrylate compounds is preferably below 5000 g/mol, particularly preferably below 3000 g/mol.

Unsaturated polyesters are also suitable as free-radically polymerizable compounds.

The content of free-radically polymerizable compounds in the radiation-curable compositions is preferably 0–99%, particularly preferably 0–70%, and, with very particular preference, 0–30%, based on the overall weight of the cationically and free-radically polymerizable compounds.

The radiation-curable compositions preferably contain a photo-initiator for the photopolymerization.

The total amount of photoinitiator is preferably 0.1–10%, particularly preferably 0.5–5%, based on the overall weight of the cationically and, if present, free-radically polymerizable compounds.

Cationic photopolymerization photoinitiators, when irradiated with UV light, provide acids; examples of such initiators which may be mentioned are aryldiazonium, aryliodonium or arylsulfonium salts, disulfones, diazodisulfones, imidotriflates, and benzoin tosylates of the following structures:

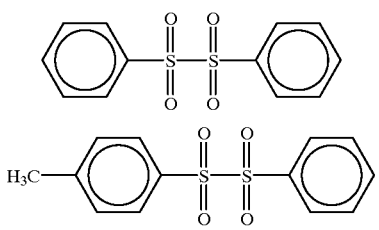

Further examples which may be mentioned are p-methoxybenzenediazonium hexafluorophosphate, benzenediazonium tetrafluoroborate, toluenediazonium tetrafluoroarsenate, diphenyliodonium hexafluoroarsenate, triphenylsulfonium hexafluorophosphate, benzenesulfonium hexafluorophosphate, toluenesulfonium hexafluorophosphate or Degacure KI85 (bis[4-diphenylsulfonio-phenyl] sulfide bishexafluorophosphate), isoquinolinium salts, phenylpyridinium salts or picolinium salts, for example N-ethoxyisoquinolinium hexafluorophosphate, N-ethoxy-4-phenylpyridinium hexafluorophosphate or N-ethoxy-2-picolinium hexafluorophosphate. Ferrocenium salts (eg. Irgacure 261 from Ciba) or titanocenes are also suitable.

Where the radiation-curable compositions also contain free-radically polymerizable compounds, photoinitiators for free-radical photopolymerization are preferably also used in proportion to the content of these compounds.

Also possible is the exclusive use of photoinitiators for free-radical polymerization, especially when the proportion of free-radically polymerizable compounds is more than 30% of the overall weight of the polymerizable compounds.

Examples of suitable photoinitiators for free-radical polymerization are benzophenone and derivatives thereof, for example alkylbenzophenones, halomethylated benzophenones, Michler's ketone, and also benzoin and benzoin ethers such as ethyl benzoin ether; benzil ketals such as benzil dimethyl ketal, acetophenone derivatives such as, for example, 2-hydroxy-1-methylphenylpropan-1-one and hydroxycyclohexyl phenyl ketone; anthraquinone and its derivatives, such as methylanthraquinone, and, in particular, acylphosphine oxides, for example Lucirin TPO (2,4,6-trimethylbenzoyldiphenylphosphine oxide) and bisacylphosphine oxides.

In order to produce coatings the radiation-curable compositions are applied to the substrates to be coated, which consist for example of wood, paper, plastic or metal or, in order to produce moldings, are introduced into the mold provided.

These radiation-curable compositions may include the additives which are customary for the particular intended application.

When used as coating compositions their additives may, for example, be leveling agents, reinforcing agents, pigments or fillers.

Radiation curing is preferably carried out using UV light. Examples of suitable UV sources are those with a wavelength range of 240–400 nm and an output of 50–240 W/cm.

With particular preference, the radiation-curable compositions are suitable for producing coatings on wood, plastic, paper and metal, being crosslinked, ie. cured, by means of electron beams or, following the addition of photoinitiators, by UV radiation, to give coatings which meet the requirements of protective or decorative coatings.

The radiation-curable compositions are of high reactivity; in other words, their curing rate on radiation curing is high.

The coatings or moldings obtained exhibit good performance properties.

EXAMPLES

Example 1

2,3-Dihydrofuran, and Irgacure® 261 as photoinitiator, were dissolved in methylene chloride. The concentration of the monomer was 3 mol/l and that of the initiator was 10 mmol/l. The reaction solution was irradiated at room temperature using a mercury/xenon vapor lamp and then precipitated in an ammoniacal solution of methanol. The reaction was very exothermic. The conversion was 15% after 15 seconds, with complete conversion being obtained in less than 120 seconds.

The polymer obtained is colorless and transparent; the mean degree of polymerization $P_n$ was 220, with a polydispersity $M_w/M_n$ of 1.8.

Example 2

Benzo(b)furan and Irgacure 261 were dissolved in methylene chloride. The concentration of the monomer was 3 mol/l, and that of the initiator was 10 mmol/l. The internal standard used for gas chromatography was toluene. The reaction solution was irradiated at room temperature using a mercury/xenon vapor lamp and then precipitated in an ammoniacal solution of methanol. The conversion after 5 minutes was 76%; the polymer is obtained as a dark amorphous powder.

Example 3

2,3-Dihydrofuran, ethyl acrylate and Lucirin TPO were dissolved in toluene. The concentration of each of the monomers was 1.5 mol/l, and that of the initiator was 10 mmol/l. The reaction solution was irradiated at room temperature using a mercury/xenon vapor lamp and then precipitated in methanol. The polymer obtained is glass-clear, colorless and of highly viscous consistency. The ratio of vinyl ether to acrylate in the copolymer was 1.3. The mean degree of polymerization $P_n$ was 23.

Example 4

Polymerization of 2,3-dihydrofuran with benzene-1,4-dimethyl((2,3-dihydrofuran-3-yl)-2-ethyl) ether 741 mg of 2,3-dihydrofuran (5.714 mol/l), 160 mg of benzene-1,4-dimethyl((2,3-dihydrofuran-3-yl)-2-ethyl) ether (0.286 mol/l) (6 mol/l total concentration) and 5.2 mg of N-ethoxy-2-picolinium hexafluorophosphate (10 mmol/l) are made up to 1.85 ml with methylene chloride and dissolved.

The mixture is irradiated for 15 minutes and the crosslinked product is dried at 60° C. under reduced pressure for 48 hours.

IR (KBr disk; cm$^{-1}$): 2942, 2865, 1452, 1362, 1214, 1072, 842, 698

Comparison Example 1

3,4-Dihydro-2H-pyran and Irgacure 261 were dissolved in methylene chloride. The concentration of the monomer was 3 mol/l, and that of the initiator was 10 mmol/l. The reaction solution was irradiated at room temperature using a mercury/xenon vapor lamp and then precipitated in an ammoniacal solution of methanol. The conversion after 5 minutes was 9%, after 6.5 minutes was 44% and after one hour was 93%. The polymer obtained is colorless and transparent; the mean degree of polymerization $P_n$ was 24 with a polydispersity $M_w/M_n$ of 1.5.

Comparison Example 2

Example 1 was repeated but using only ethyl acrylate and no cationically polymerizable compounds.

The initiator used was Lucirin TPO. The solvent, rather than methylene chloride, was toluene. The conversion was 80% after 15 minutes.

Coating Examples

Cationic Curing

A) A mixture of 5.5 parts of a cycloaliphatic diepoxide (Degacure K126, Degussa), 2.5 parts of a polycaprolactone (Capa 305 from Solvay Interox, OH number 310), 2.0 parts of butanediol diglycidyl ether (Araldit DY 026 SP, Ciba Geigy) and 0.3 parts of a 33% strength solution of bis[4-(diphenylsulfonio)phenyl] sulfide bishexafluorophosphate in propylene carbonate (Degacure KI 85, Degussa) is applied by knife coating in a layer thickness of 100 µm (wet), irradiated with UV light (2×80 W/cm) at a belt speed of 15 m/min, and then post-cured at 160° C. for 10 minutes.

B) as A) but with addition of 2.0 parts of 2,3-dihydrofuran.

C) as A) but with addition of 2.0 parts of 3,5-dihydro-2H-pyran.

Performance Tests

The pendulum hardness was determined in accordance with DIN 53157 and is a measure of the hardness of the coating. The figures given are in seconds (s), high values denoting a high degree of hardness.

The Erichsen indentation was determined in accordance with DIN 53156 and is a measure of flexibility and elasticity. The figures given are in millimeters (mm), with high values denoting high flexibility.

The adhesion of the coating to substrates was determined by means of the crosshatch test in accordance with DIN 53151. Low values indicate good adhesion.

| Results film | Pendulum hardness [s] | Erichsen indentation [mm] | Adhesion by crosshatch/Tesa (adhesive tape) test (carried out in duplicate) |
|---|---|---|---|
| A | 176 | 6.5 | 1/2 |
| B | 140 | 7.1 | 1/1 |
| C | 120 | 7.5 | 1/2 |

Combined Free-Radical/Cationic Curing

D) 100 parts of a polyester acrylate (Laromer® Pe 55 F, BASF) are mixed with 4 parts of a photoinitiator (Irgacure 500, Ciba Geigy) and the mixture is irradiated under UV light (2×80 W/cm) at a belt speed of 6.5 m/min.

E) as D) but with addition of 20 parts of 2,3-dihydrofuran and 2 parts of Degacure KI 85 (Degussa)

F) as D) but with addition of 20 parts of 3,5-dihydro-2H-pyran and 2 parts of Degacure KI 85 (Degussa)

| Results film | Pendulum hardness [s] | Erichsen indentation [mm] | Adhesion by crosshatch/Tesa (adhesive tape) test |
|---|---|---|---|
| D | 125 | 5.6 | ½–3 |
| E | 117 | 5.8 | 0/1 |
| F | 95 | 5.7 | 0/0 |

Batch E possesses the best profile of properties: good hardness coupled with high flexibility and very good adhesion.

Synthesis Examples

S1: Synthesis of 3-(hydroxymethyl)-2,3-dihydrofuran a) Synthesis takes place first of all by Birch reduction of 3-furancarboxylic acid followed by esterification with benzyl bromide to form benzyl 2,3-dihydrofuran-3-carboxylate (in accordance with G. Lowe, St. Swain; J. Chem. Soc. Perkin Trans I (1985), 391)

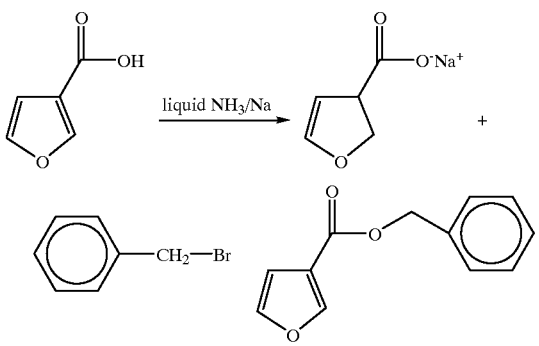

b) The end product from a) is reduced with lithium aluminum hydride to give 3-hydroxymethyl-2,3-dihydrofuran Procedure 1.5 mmol of lithium aluminum hydride are placed in 5 ml of absolute diethyl ether, and a solution of 2.65 mmol of benzyl 2,3-dihydrofuran-3-carboxylate is added dropwise. The mixture is stirred at room temperature for 4 hours, and then water is carefully added dropwise. The organic phase is decanted, and the aqueous residue is extracted by washing with ether. The combined organic phases are dried over sodium sulfate and the solvent is removed by distillation on a rotary evaporator.

The crude product is purified by column chromatography (eluent: diethyl ether).

Yield: 76% of theory. $^1$H-NMR (CDCl$_3$; ppm):

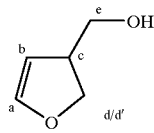

3.2 (c 1H); 3.6 (e 2H); 4.2 and 4.4 (d and d' 2H); 4.9 (b 1H); 6.4 (a 1H) IR (film, cm$^{-1}$) 3397, 3102, 2948, 2885, 1614, 1139, 1091, 1037, 984, 934, 905, 725

S2: Synthesis of benzene-1,4-dimethyl ((2,3-dihydrofuran-3-yl)-2-ethyl) ether

Melting point: 58.5° C. $^1$H-NMR (CDCl$_3$; ppm):

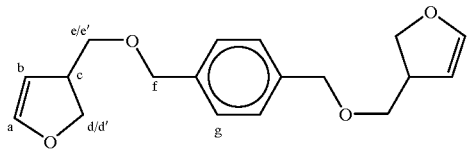

3.2 (c 2H); 3.4 and 3.5 (e and e' 4H); 4.2 and 4.3 (d and d' 4H); 4.5 (f 4H); 4.9 (b 2H); 6.4 (a2 H; 7.3 (g 4H) $^{13}$C-NMR (CDCl$_3$; ppm):

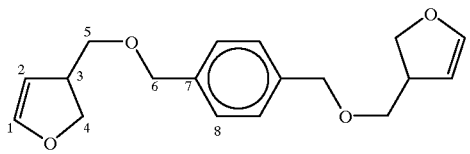

43 (3); 73 (3 signals still just resolved) (4), (5) and (6); 101 (2); 128 (8); 138 (7); 147 (1) IR (film, cm$^{-1}$): 3090, 3029, 2951, 2858, 1612, 1358, 1138, 1092, 722

22.9 mmol of 3-hydroxymethyl-2,3-dihydrofuran and 7.6 mmol of 1,4-dibromomethylbenzene are introduced at 0° C., and 3.9 g of 50% strength potassium hydroxide solution and 80 mg of tetrabutylammonium bromide are added in succession.

A pastelike white mass is formed which is stirred at room temperature for one day. The emulsion is extracted with ether and the organic phase is washed with water and dried over sodium sulfate. The solvent is removed by distillation on a rotary evaporator and the crude product is purified by column chromatography (eluent: ethyl acetate/n-hexane 1/10)

We claim:

1. A compound having two or more 2,3-dihydrofuran groups.

2. A compound as claimed in claim 1, obtained by reacting hydroxy-functionalized 2,3-dihydrofurans with polyfunctional carboxylic acids, isocyanates, epoxides, glycidyl ethers and/or chloroformates.

3. A compound as claimed in claim 1, obtained by reacting carboxy-functionalized 2,3-dihydrofurans with polyfunctional alcohols, amines, epoxides, glycidyl ethers and/or hydrazines.

4. A compound as claimed in claim 1, obtained by etherifying 3-hydroxymethyl-2,3-dihydrofuran with halo-substituted hydrocarbons.

5. The compound as claimed in claim 1, and having one of the following formulae IIa, IIb, IIIa, or IIIb:

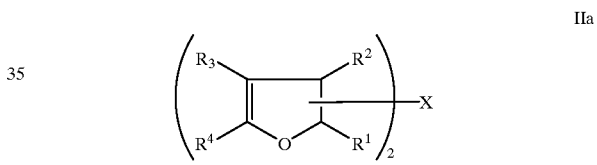

IIa

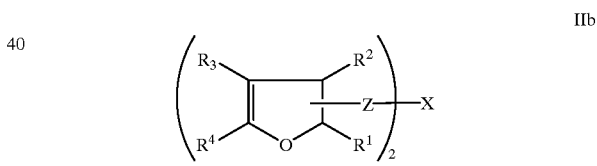

IIb

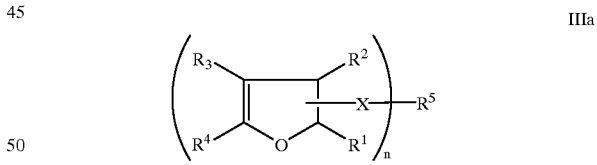

IIIa

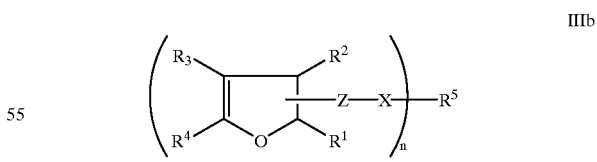

IIIb

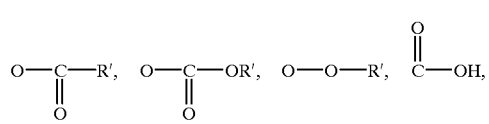

-continued

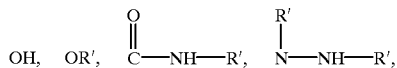

an aromatic or aliphatic hydrocarbon radical of 1–20 carbons with or without one or more carbonyl or ether groups, which may be substituted by one or more hydroxyls, or are $SiR'_3$, wherein $R'$ is H or an organic radical of 1–20 carbons, $R^3$ is H, $C_1$–$C_{20}$-alkyl or $C_1$–$C_{20}$-alkoxy, $R^4$ is H, $C_1$–$C_{20}$-alkyl or $C_5$–$C_{20}$-aryl, -aralkyl or -alkaryl, or $C_1$–$C_{20}$-hydroxyalkyl, except that one of $R_1$–$R_4$ is replaced by X in formulae IIa or IIIa, or replaced by Z in formulae IIb or IIIb, X is a single bond or a divalent group selected from the group consisting of

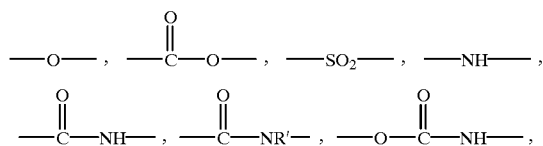

-continued

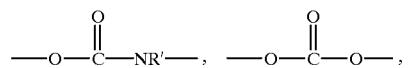

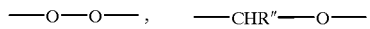

(where $R'' =$ phenyl, naphthyl, 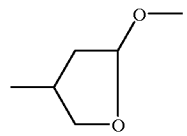

Z is a single bond, $C_1$–$C_{10}$-alkylene or phenylene, n is 2–20, and $R^5$ is a polyvalent hydrocarbon radical of 1–20 carbon atoms, with or without ether or ester groups.

* * * * *